United States Patent
Darby

(10) Patent No.: US 11,247,326 B2
(45) Date of Patent: Feb. 15, 2022

(54) MECHANISM FOR FORMING ORTHOGONAL JOINTS IN CONDUITS

(71) Applicant: Nation Wide Products LLC, Abilene, TX (US)

(72) Inventor: Jason Darby, Abilene, TX (US)

(73) Assignee: Nation Wide Products LLC, Abilene, TX (US)

( * ) Notice: Subject to any disclaimer, the term of this patent is extended or adjusted under 35 U.S.C. 154(b) by 94 days.

(21) Appl. No.: 16/582,288

(22) Filed: Sep. 25, 2019

(65) Prior Publication Data

US 2021/0086347 A1    Mar. 25, 2021

(51) Int. Cl.
*B25H 7/00* (2006.01)
*B23K 7/00* (2006.01)
*F16L 25/14* (2006.01)

(52) U.S. Cl.
CPC .......... *B25H 7/005* (2013.01); *B23K 7/007* (2013.01); *F16L 25/14* (2013.01)

(58) Field of Classification Search
CPC .......... B25H 7/005; B25H 7/00; B23K 7/007; B23K 7/006; B23K 7/005
USPC ................................... 33/529, 21.3
See application file for complete search history.

(56) References Cited

U.S. PATENT DOCUMENTS

| | | | | |
|---|---|---|---|---|
| 141,645 A | * | 8/1873 | Home | G01B 5/24 33/529 |
| 923,875 A | * | 6/1909 | McDonald | G01B 5/24 33/529 |
| 1,535,980 A | * | 4/1925 | Campbell | B25H 7/005 33/561.2 |
| 1,683,953 A | * | 9/1928 | Carr | G01B 3/14 33/529 |
| 3,128,560 A | * | 4/1964 | McKenzie | B25H 7/00 33/529 |
| 3,209,459 A | * | 10/1965 | Fish, Jr. | F16L 41/02 33/562 |
| 4,653,195 A | * | 3/1987 | Esparza | B23K 7/10 266/64 |
| D319,794 S | | 9/1991 | Elkins | |
| 5,450,677 A | * | 9/1995 | Casey | B25H 7/005 33/373 |

(Continued)

FOREIGN PATENT DOCUMENTS

GB            2579845 A   *   7/2020   ............. B25H 7/005

*Primary Examiner* — Christopher W Fulton
(74) *Attorney, Agent, or Firm* — Norton Rose Fulbright US LLP

(57) ABSTRACT

The present disclosure provides an apparatus for forming orthogonal joints in conduits. The apparatus includes a first piece including a first plurality of curved openings and a second piece including a second plurality of curved openings. The apparatus includes a hinge configured to couple the first piece to the second piece and to enable the first and second pieces to be configurable in each of a closed position and an open position, where, when in the open position, the first piece is positioned adjacent to the second piece and, when in the closed position, the first and second pieces are configured to define a channel for receiving a conduit and each of the first plurality of curved openings is aligned with a corresponding one of the second plurality of curved openings. The apparatus further includes one or more magnets coupled to the first or the second piece.

20 Claims, 12 Drawing Sheets

(56) References Cited

U.S. PATENT DOCUMENTS

| | | | |
|---|---|---|---|
| 6,216,354 B1 * | 4/2001 | Carbone | B43L 13/20 33/27.01 |
| 7,117,606 B2 * | 10/2006 | Brown | G01C 9/28 33/365 |
| 7,251,902 B1 | 8/2007 | Mueller | |
| 7,437,828 B1 | 10/2008 | Rozmiarek | |
| 8,296,959 B1 | 10/2012 | Brooks | |
| 10,035,257 B2 * | 7/2018 | Darby | B25H 7/005 |
| 2004/0216313 A1 * | 11/2004 | Marshall | G01C 15/008 33/286 |
| 2006/0225291 A1 | 10/2006 | Marks | |
| 2011/0030231 A1 | 2/2011 | Mueller et al. | |
| 2017/0282355 A1 | 10/2017 | Darby et al. | |
| 2017/0355075 A1 * | 12/2017 | Martin | B25H 7/005 |

* cited by examiner

MECHANISM FOR FORMING ORTHOGONAL JOINTS IN CONDUITS

TECHNICAL FIELD

The present disclosure is generally related to mechanisms for holding and marking conduits (e.g., pipes or tubes) to form joints comprising conduits of differing diameter.

BACKGROUND

Conduits, such as pipes or other tubes, may be cut in various shapes and sizes to construct various products. For example, a conduit may be cut perpendicular to its axis or at an angle. Pipe guides enable a user to mark a conduit in positions that are to be cut. However, pipe guides often enable marking of only one, or a few, positions. Additionally, pipe guides are designed to fit onto a single conduit. If marking of multiple conduits having different diameters, a single pipe guide is insufficient. Additionally, pipe guides do not typically enable marking of a shape on the conduit that can be used to form an orthogonal joint.

BRIEF SUMMARY

Embodiments of the present disclosure provide mechanisms (e.g., apparatuses) for forming orthogonal joints in conduits, such as pipes or tubes, having different diameters. In a particular implementation, the mechanism includes a first piece that includes a first plurality of curved openings and a second piece that includes a second plurality of curved openings. The pieces may be metal, plastic, or another material. The first piece, the second piece, or both also include one or more magnets. In some implementations, the one or more magnets may be recessed into the inner surface of the respective piece. In other implementations, the magnets may be strips or layers of magnetic material that are coupled to the respective piece. The mechanism also includes a hinge configured to couple the first piece to the second piece. The hinge enables the first piece and the second piece (e.g., the mechanism) to be configurable in an open position and a closed position. In the open position, the first piece is adjacent to the second piece, and a conduit may be disposed against the one or more magnets of one of the pieces. The first piece and the second piece may then be rotated to the closed position, such that the first piece and the second piece (e.g., the mechanism) forms a channel to receive the conduit. The mechanism is configured to magnetically couple to the conduit (due to the one or more magnets), such that the mechanism does not slide or move about the conduit while a user marks on the conduit according to the pluralities of curved openings. Marking the conduit in such a manner creates a pattern that can be cut into the conduit to form a shape (e.g., a saddle shape) that is used to make an orthogonal joint with another conduit. Because the plurality of curved openings include different shaped and sized openings, the mechanism can be used to form a saddle shape on a conduit for connecting to conduits having differing diameters.

According to one embodiment, an apparatus for forming orthogonal joints in conduits is described. The apparatus includes a first piece including a first plurality of curved openings. The apparatus includes a second piece including a second plurality of curved openings. The apparatus includes a hinge configured to couple the first piece to the second piece and to enable the first piece and the second piece to be configurable in each of a closed position and an open position, where, when in the open position, the first piece is positioned adjacent to the second piece and, when in the closed position, the first piece and the second piece are configured to define a channel for receiving a conduit and each of the first plurality of curved openings is aligned with a corresponding one of the second plurality of curved openings. The apparatus further includes one or more magnets coupled to the first piece or to the second piece.

In some of the foregoing embodiments, one or more characteristics of a first curved opening of the first plurality of curved openings corresponds to a measurement of a first receiving conduit, and one or more characteristics of a second curved opening of the first plurality of curved openings corresponds to a measurement of a second receiving conduit. In some of the foregoing embodiments, a distance from a first end of the first piece to a second end of the first piece along an edge of the first piece is greater than or equal to a distance from the first end to the second end at a position between a first edge of the first piece and a second edge of the first piece. Additionally, or alternatively, the first piece includes a first notch disposed along a first end of the first piece, the second piece includes a second notch disposed along a first end of the second piece, and the first end of the first piece and the first end of the second piece are at the same end. In some such embodiments, when the first piece and the second piece are in the closed position, the first notch is positioned approximately 180 degrees from the second notch. Additionally, or alternatively, the one or more magnets include a first magnet recessed within an inner surface of the first piece and a second magnet recessed within an inner surface of the second piece. Additionally, or alternatively, the first piece includes a first tab, the second piece includes a second tab, or a combination thereof.

According to yet another embodiment, an apparatus for forming orthogonal joints in conduits is described. The apparatus includes a first piece including a first plurality of openings. The apparatus includes a second piece including a second plurality of openings. The first piece or the second piece includes at least one tab. The apparatus further includes a hinge configured to couple the first piece to the second piece and to enable the first piece and the second piece to be configurable in each of a closed position and an open position, where, when in the open position, the first piece is positioned adjacent to the second piece and, when in the closed configuration, the first piece and the second piece are configured to define a channel for receiving a conduit.

In some of the foregoing embodiments, the at least one tab is positioned on an opposite edge of the first piece or the second piece as the hinge. Additionally, or alternatively, the at least one tab includes a first table included on the first piece and a second tab included on the second piece. In some such embodiments, the first tab is aligned with a first end of the first piece and the second tab is aligned with a second end of the second piece, the first end opposite of the second end in a longitudinal direction. Additionally, or alternatively, the apparatus includes at least one magnet recessed within an inner surface of the first piece or recessed within an inner surface of the second piece.

According to yet another embodiment, an apparatus for forming orthogonal joints in conduits is described. The apparatus includes a first piece including a first plurality of openings. The apparatus includes a first magnet recessed within an inner surface of the first piece. The apparatus further includes a hinge configured to couple the first piece to a second piece and to enable the first piece and the second piece to be configurable in each of a closed position and an open position.

In some of the foregoing embodiments, the first magnet has a circular shape. Additionally, or alternatively, a surface of the first magnet is substantially coplanar with respect to at least a portion of the inner surface of the first piece. Additionally, or alternatively, the first magnet is positioned in a longitudinal direction between a first opening of the first plurality of openings and a second opening of the first plurality of openings. In some such embodiments, a distance in the longitudinal direction between the first magnet and the first opening and a distance in the longitudinal direction between the first magnet and the second opening are less than a distance in the longitudinal direction between the first opening and the second opening.

In some of the foregoing embodiments, the apparatus further includes the second piece including a second plurality of openings, where, when in the open position, the first piece is adjacent to the second piece and, when in the closed position, the first piece and the second piece define a channel configured to receive a conduit. The apparatus also includes a second magnet recessed within an inner surface of the second piece. In some such embodiments, when in the closed position, the first magnet is aligned with the second magnet. In some such embodiments, the apparatus further includes one or more additional magnets recessed in the inner surface of the first piece and one or more additional magnets recessed in the inner surface of the second piece. Additionally, or alternatively, the first piece includes a first tab, the second piece includes a second tab, or both.

The foregoing has outlined rather broadly the features and technical advantages of the present disclosure in order that the detailed description that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which.

DETAILED DESCRIPTION OF THE INVENTION

Figure 1:
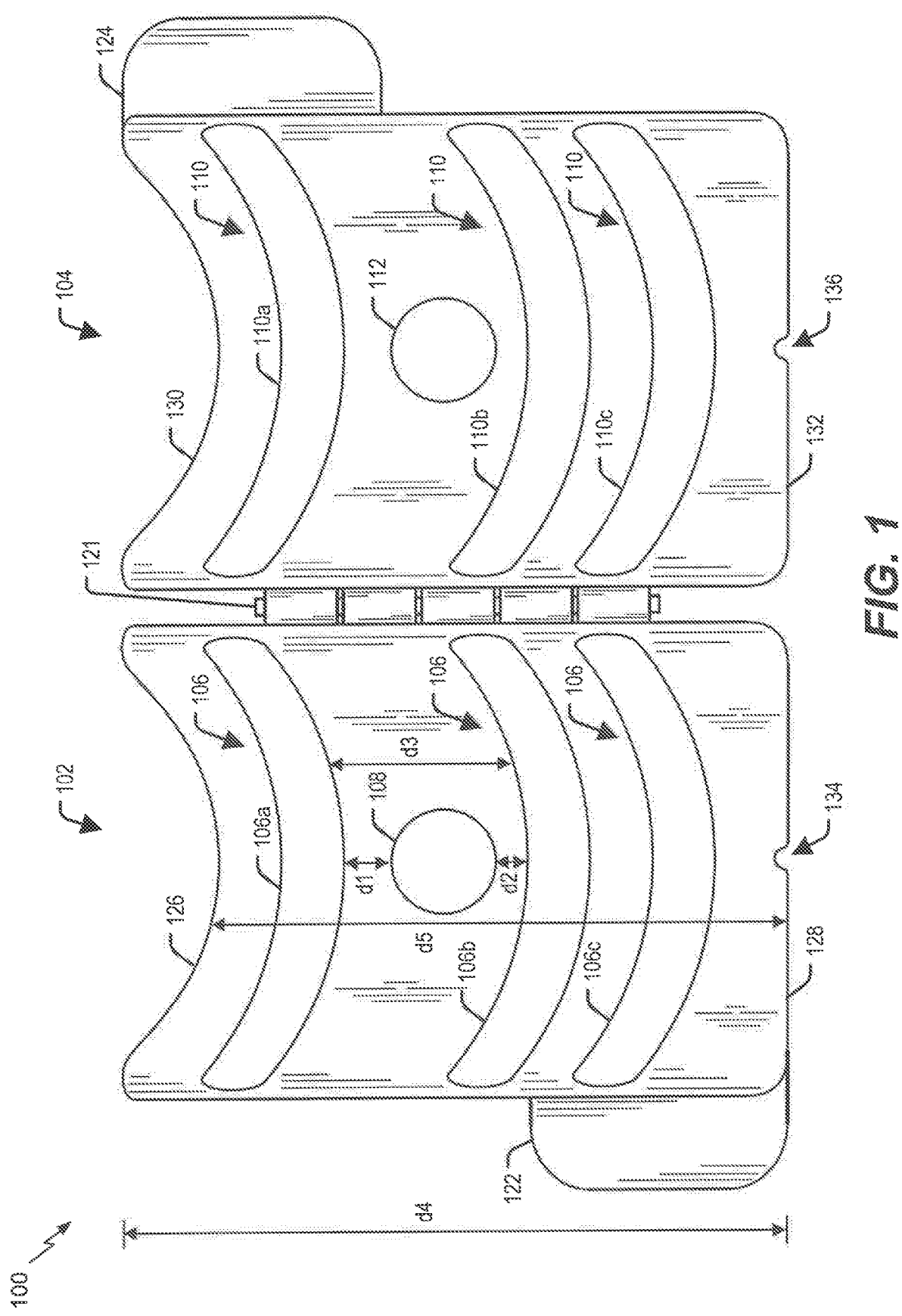
FIG. 1 is a diagram of a front view of an example of a mechanism for forming orthogonal joints in conduits that may have differing diameters, the mechanism in an open position.

Inventive concepts provide a mechanism that enables formation of orthogonal joints in conduits that may have differing diameters. In a particular implementation, the mechanism includes a first piece that includes a first plurality of curved openings and a second piece that includes a second plurality of curved openings. The pieces may be metal, plastic, or another material. The first piece, the second piece, or both also include one or more magnets. In some implementations, the one or more magnets may be recessed into the inner surface of the respective piece. In other implementations, the magnets may be strips or layers of magnetic material that are coupled to the respective piece. The mechanism also includes a hinge configured to couple the first piece to the second piece. The hinge enables the first piece and the second piece (e.g., the mechanism) to be configurable in an open position and a closed position.

When the mechanism is in the open position, the first piece is adjacent to the second piece. When the mechanism is in the open position, a conduit may be disposed against the one or more magnets of one of the pieces (and disposed within the piece). The first piece and the second piece may then be rotated to the closed position, such that the first piece and the second piece (e.g., the mechanism) forms a channel to receive the conduit. The mechanism is configured to magnetically couple to the conduit (due to the one or more magnets), such that the mechanism does not slide or move about the conduit. After closing the mechanism about the conduit, a user may mark (e.g., using a pen or marker) on the conduit according to the pluralities of curved openings. Marking the conduit in such a manner creates a pattern that can be cut into the conduit to form a shape (e.g., a saddle shape) that is used to make an orthogonal joint with another conduit. Because the pluralities of curved openings include curved openings having a slightly different size and/or shape, the mechanism can be used on conduits for forming orthogonal joints with conduits of differing diameters. Additionally, in some implementations, the first piece, the second piece, or both include tabs that make it easier for a user to transition the mechanism from the open position to the closed position or from the closed position to the open position.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a front view of a mechanism for forming orthogonal joints in conduits that may have differing diameters is shown and designated 100. Mechanism 100 includes a first piece 102 and a second piece 104. In a particular implementation, first piece 102 and second piece 104 are formed from metal, or a metal alloy. In other implementations, first piece 102 and second piece 104 may be formed from other materials, such as plastic.

First piece 102 includes a first plurality of curved openings 106 and a first magnet 108. In a particular implementation, first magnet 108 may be recessed within an inner surface of first piece 102, as further described herein. Second piece 104 includes a second plurality of curved openings 110 and a second magnet 112. In a particular implementation, second magnet 112 may be recessed within an inner surface of second piece 104, as further described herein. In other implementations, first piece 102, second piece 104, or both, may include multiple magnets, as further described with reference to FIG. 5. In still other implementations, first piece 102, second piece 104, or both, may include one or more layers of magnetic material, as further described with reference to FIGS. 6 and 7.

First plurality of curved openings 106 and second plurality of curved openings 110 include multiple curved openings in the corresponding piece of mechanism 100. As an illustrative example, first plurality of curved openings 106 include at least a first curved opening 106*a*, a second curved opening 106*b*, and a third curved opening 106*c*, and second plurality of curved openings 110 include at least a fourth curved opening 110*a*, a fifth curved opening 110*b*, and a sixth curved opening 110*c*. Although three curved openings are illustrated in each piece in FIG. 1, in other implementations, each of pieces 102-104 may include more than three curved openings or fewer than three curved openings. In some implementations, each piece may include a single curved opening. The curved openings may also be referred to herein as "cut features." The curved openings may be formed by punching, cutting, etching, or another technique to form curved openings in first piece 102 and second piece 104.

Mechanism 100 also includes a hinge 121. Hinge 121 is configured to couple first piece 102 to second piece 104 and to enable first piece 102 and second piece 104 (e.g., mechanism 100) to be configurable in each of a closed position and an open position. When in the open position, as illustrated in FIG. 1, first piece 102 is adjacent to second piece 104. In a particular implementation, first piece 102 may include a portion of hinge 121, second piece 104 may include a portion of hinge 121, and hinge 121 may further include a rod or pin inserted into the hinge portions to enable first piece 102 and second piece 104 (e.g., mechanism 100) to transition from the open position to the closed position or from the closed position to the open position. In other implementations, hinge 121 is a separate component that is coupled to first piece 102 and to second piece 104, such as via screws, adhesive, other types of bonding, etc. In still other implementations, mechanism 100 may include a single piece (e.g., no hinge may be included), as further described with reference to FIG. 8.

Figure 2:
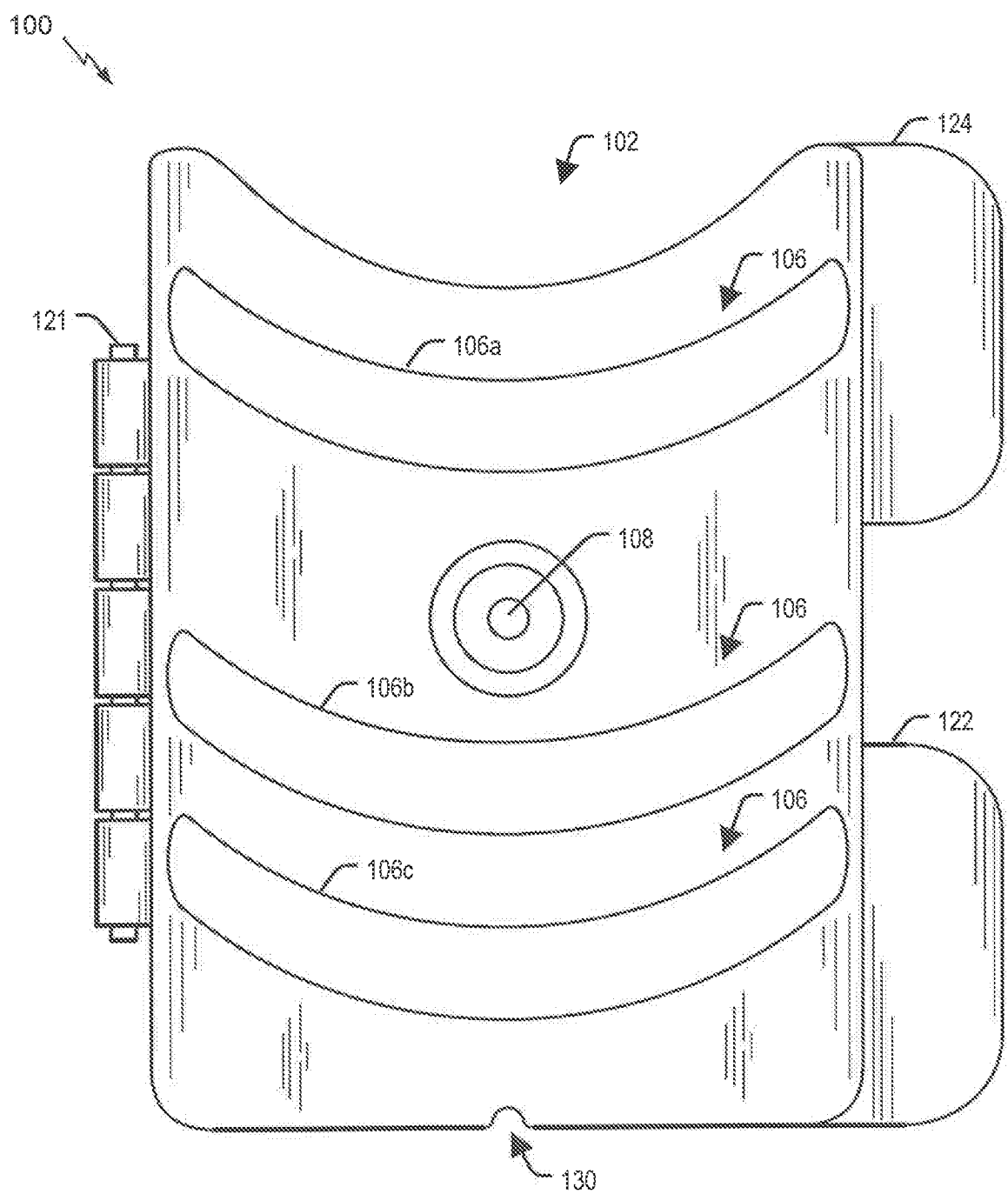
FIG. 2 is a diagram of a front view of an example of the mechanism of FIG. 1, the mechanism in a closed position.
Figure 3:
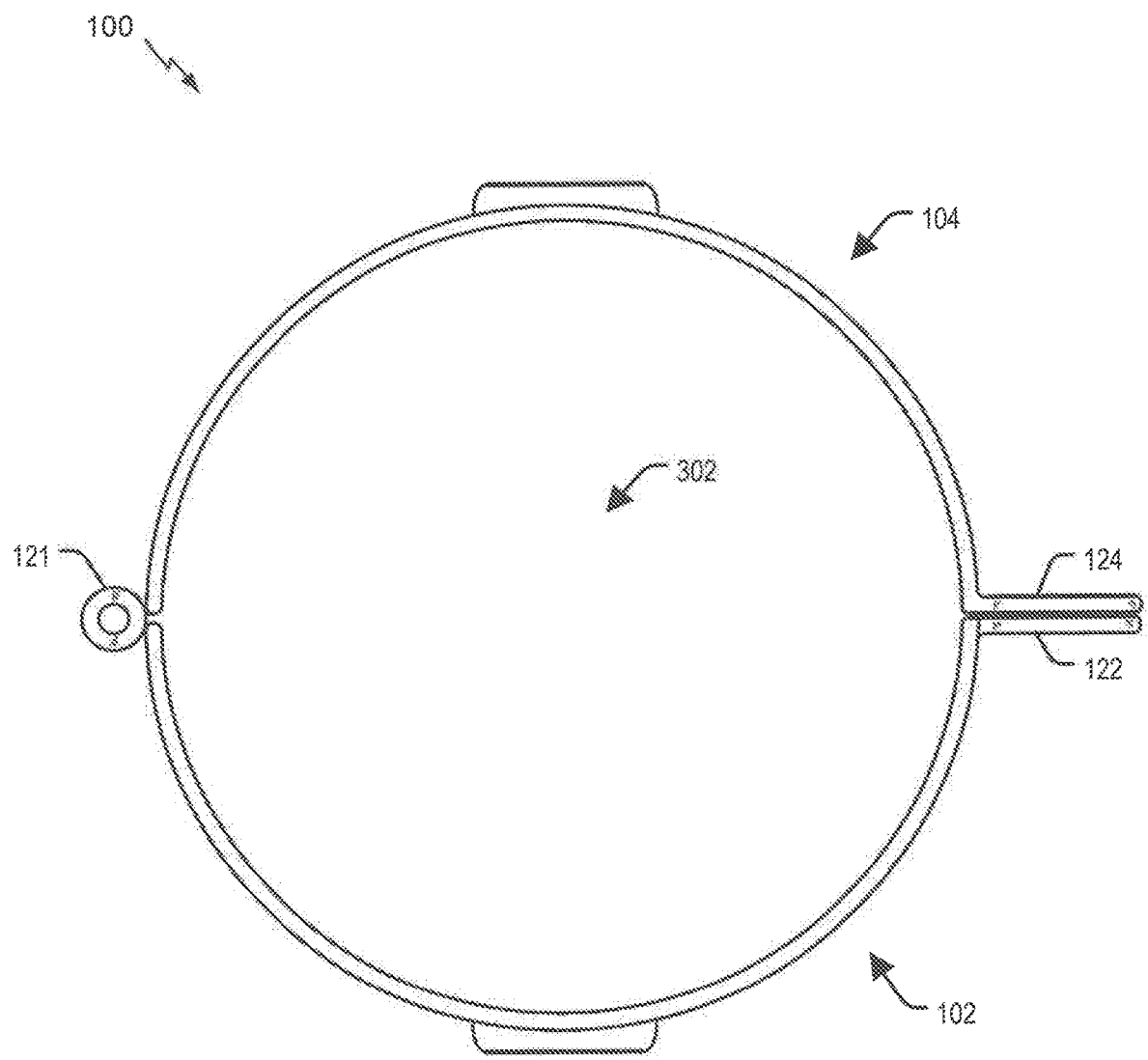
FIG. 3 is a diagram of a top view of an example of the mechanism of FIG. 1, the mechanism in a closed position.

To transition first piece 102 and second piece 104 (e.g., mechanism 100) to the closed configuration, first piece 102 may be rotated about hinge 121 towards second piece 104. FIG. 2 illustrates a front view of mechanism 100 in the closed position. As illustrated in FIG. 2, when in the closed position, first piece 102 aligns with second piece 104 (such that only first piece 102 is visible in FIG. 2). Mechanism 100 has a circular shape in the closed position, as illustrated by FIG. 3, which depicts a top view of mechanism 100. As illustrated in FIG. 3, when semicircular first piece 102 and semicircular second piece 104 are positioned together, mechanism 100 has a cylindrical shape. Stated another way, when in the closed position, first piece 102 and second piece 104 (e.g., mechanism 100) are configured to define a channel 302 for receiving a conduit (e.g., a pipe). The channel may have a substantially cylindrical shape such that the channel may receive a conduit. Mechanism 100 may be kept in place surrounding the conduit (e.g., may not slip or move about the conduit) due to first magnet 108, second magnet 112, or both. For example, first magnet 108, second magnet 112, or both, may magnetically couple to the conduit when first piece 102 and second piece 104 (e.g., mechanism 100) are in the closed position.

Additionally, when in the closed position, each of first plurality of curved openings 106 is aligned with a corresponding one of second plurality of curved openings 110. For example, first curved opening 106a is aligned with fourth curved opening 110a when mechanism 100 is in the closed position. As another example, second curved opening 106b is aligned with fifth curved opening 110b when mechanism 100 is in the closed position. The curved openings are aligned because the curved openings may be disposed in the same locations on the different pieces. For example, one curved opening may be disposed particular distances from the ends and edges of first piece 102, and another curved opening may be disposed the same particular distances from the ends and edges of second piece 104. Because the curved openings of first piece 102 are aligned with the curved openings of second piece 104, the conduit held by mechanism 100 may be marked to have a particular shape (e.g., based on the curved openings). In a particular implementation, the particular shape is a "saddle" shape.

To illustrate, when in the open configuration, a conduit (e.g., a pipe) may be placed against first magnet 108 of first piece 102. Mechanism 100 may be transitioned to the closed position to surround the conduit and be magnetically coupled to the conduit. First plurality of curved openings 106 and second plurality of curved openings 110 enable the conduit to be marked, for example using a pen or a marker, to outline a particular shape of an end of the conduit. Once the conduit is marked, mechanism 100 may be transitioned to the open position and the conduit may be removed. After removing mechanism 100, the conduit may be cut according to the marked lines to form a particular shape (e.g., a saddle shape) that allows the conduit to be used to form an orthogonal joint with another conduit.

Figure 4B:
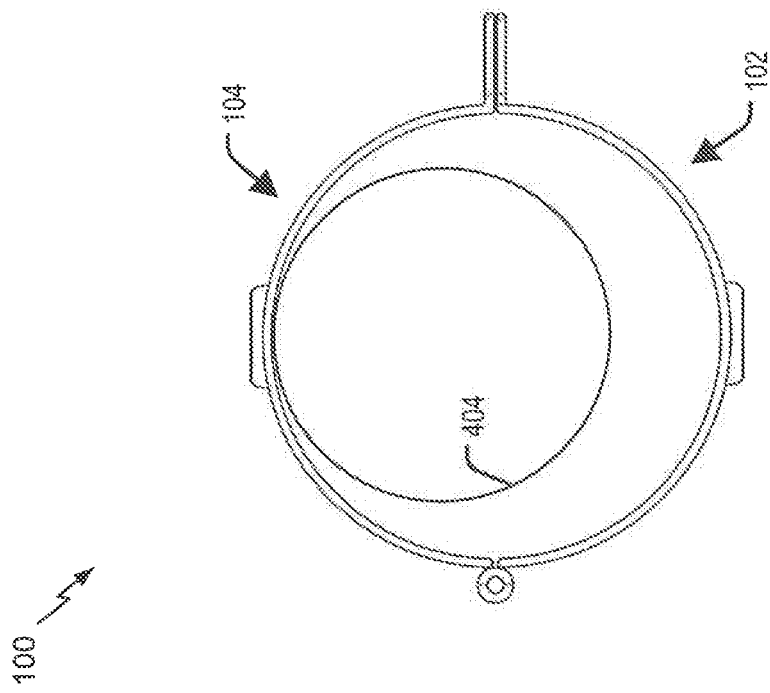
FIG. 4B is a diagram of a top view of an example of the mechanism of FIG. 1 and a second conduit.
Figure 4A:
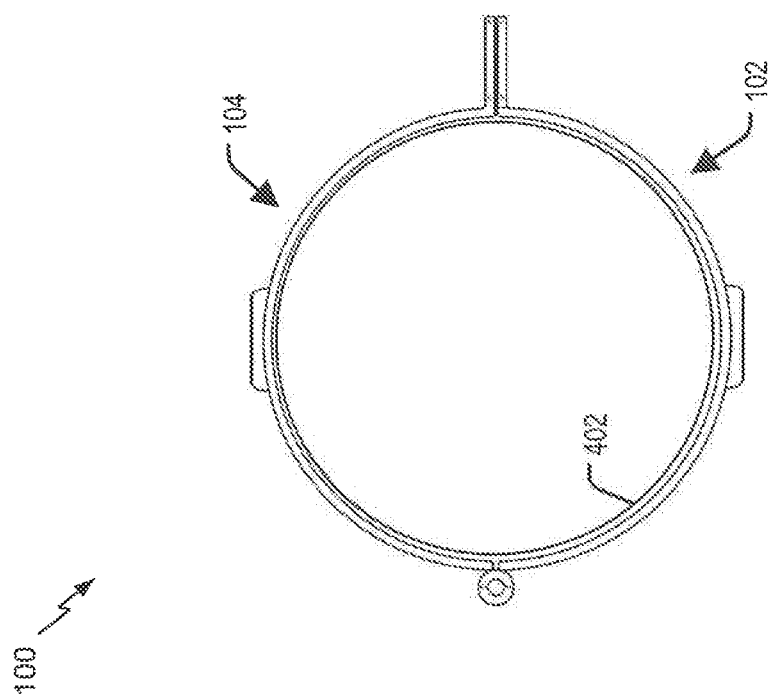
FIG. 4A is a diagram of a top view of an example of the mechanism of FIG. 1 and a first conduit.

Mechanism 100 is able to be used on a conduit to enable the conduit to be coupled (in an orthogonal joint) to conduits that may have differing diameters. For example, mechanism 100 may be used on a conduit having a diameter that is substantially similar, though slightly less, than the diameter of mechanism 100 when in the closed position. In such an example, both first magnet 108 and second magnet 112 may magnetically couple to the conduit to prevent mechanism 100 from moving while the conduit is being marked. Such an example is illustrated in FIG. 4A. For example, FIG. 4A illustrates mechanism 100 surrounding (e.g., in the closed position) a first conduit having a substantially similar diameter. Mechanism 100 may have different diameters. For example, mechanism 100 may have diameters of 1 and ⅞ inches, 2 and ⅜ inches, 2 and ⅞ inches, 3 and ½ inches, 4 and ½ inches, or other diameters. Additionally, mechanism 100 may be used on conduits having smaller diameters. For example, a conduit having a smaller diameter may be magnetically coupled to one of the magnets (e.g., either first magnet 108 or second magnet 112) and the conduit may be marked using one of the corresponding plurality of curved openings. Such an example is illustrated in FIG. 4B. For example, FIG. 4B illustrates mechanism 100 surrounding (e.g., in the closed position) a second conduit having a diameter that is less than the diameter of mechanism 100.

Different curved openings of the pluralities of curved openings correspond to different locations for the marking of the shape on the conduit. In some implementations, first plurality of curved openings 106 and second plurality of curved openings 110 may include openings having different shapes, sizes, curvatures (e.g., radius of curves), or a combination thereof. For example, first curved opening 106a may have a different size (e.g., width), a different curvature (e.g., a different radius of curve), or another different characteristic than second curved opening 106b and/or third curved opening 106c. Additionally, fourth curved opening 110a may have a different size (e.g., width), a different curvature (e.g., a different radius of curve), or another different characteristic than fifth curved opening 110b and sixth curved opening 110c. The difference characteristics of the curved openings may correspond to different diameters of conduits for which the marked conduit is to be coupled to. For example, first curved opening 106a and fourth curved opening 110a may have characteristics that enable marking of a conduit such that the conduit may form an orthogonal joint with another conduit having a first diameter, second curved opening 106b and fifth curved opening 110b may have characteristics that enable marking of the conduit such that the conduit may form an orthogonal joint with another conduit having a second diameter, and third curved opening 106c and sixth curved opening 110c may have characteristics that enable marking of the conduit such that the conduit may form an orthogonal joint with another conduit having a third diameter. To further illustrate, first curved opening 106a and fourth curved opening 110a may be used to mark a conduit that is to form an orthogonal joint with a 2 and ⅞ inch diameter conduit, second curved opening 106b and fifth curved opening 110b may be used to mark a conduit that is to form an orthogonal joint with a 3 and ½ inch conduit, and third curved opening 106c and sixth curved opening 110c may be used to mark a conduit that is to form an orthogonal joint with a 4 and ½ inch diameter conduit, as non-limiting examples. In this manner, characteristics of the curved openings may be different among first plurality of curved openings 106 and second plurality of curved openings 110, and the differences in characteristics may correspond to different diameters of receiving conduits (e.g., conduits to which the marked conduit is to be coupled to form the orthogonal joint). Although the curved openings of the pluralities of curved openings 106 and 110 are illustrated as having a first orientation in FIGS. 1 and 2 (e.g., a downward-curved orientation), in other implementations, the curved openings of the pluralities of curved openings 106 and 110 may have the reverse orientation (e.g., an upward-curved orientation).

Returning to FIG. 1, first magnet 108 may be recessed within an inner surface of first piece 102, second magnet 112 may be recessed within an inner surface of second piece 104, or both. For example, first magnet 108 may be disposed within a recess within the inner surface of first piece 102, and second magnet 112 may be disposed within a recess within the inner surface of second piece 104. A surface of first magnet 108 may be substantially coplanar with respect to at least a portion of the inner surface of first piece 102. For example, the surface of first magnet 108 may be located within the same plane as a portion of the inner surface of first piece 102 that surrounds first magnet 108. Similarly, a surface of second magnet 112 may be substantially coplanar with respect to at least a portion of the inner surface of the second piece 104.

In a particular implementation, first magnet 108 and second magnet 112 have a circular shape. In other implementations, first magnet 108 and second magnet 112 may have different shapes, such as an elliptical shape, a square shape, a rectangular shape, etc. In some implementations, first magnet 108 and second magnet 112 have the same shape, as illustrated in FIG. 1. In other implementations, first magnet 108 and second magnet 112 have different shapes. In a particular implementation, first magnet 108 and second magnet 112 have diameters of 0.5 inches. In other implementations, first magnet 108 and second magnet 112 have a different diameter. In some implementations, first magnet 108 and second magnet 112 have the same diameter. In other implementations, first magnet 108 and second magnet 112 have different diameters.

In a particular implementation, first magnet 108 is positioned in a longitudinal direction between first curved opening 106a (e.g., a first neighboring curved opening) of first plurality of curved openings 106 and second curved opening 106b (e.g., a second neighboring curved opening) of first plurality of curved openings 106. For example, in the orientation illustrated in FIG. 1, first curved opening 106a is above first magnet 108 and second curved opening 106b is below first magnet 108. In the implementation of FIG. 1, a distance d1 in the longitudinal direction between first magnet 108 and first curved opening 106a and a distance d2 in the longitudinal direction between first magnet 108 and second curved opening 106b are less than a distance d3 in the longitudinal direction between first curved opening 106a and second curved opening 106b. In some implementations, first magnet 108 is centered with respect to first curved opening 106a and/or second curved opening 106b. In some implementations, a radial distance (e.g., a radius) of first magnet 108 is less than a radial distance of second curved opening 106b. Second magnet 112 may have similar properties as first magnet 108 with respect to curved openings of second plurality of curved openings 110.

When first piece 102 and second piece 104 (e.g., mechanism 100) is in the closed position, first magnet 108 is aligned with second magnet 112. For example, first magnet 108 and second magnet 112 may be disposed the same distances from the ends and edges of the respective pieces. In an alternate implementation, first magnet 108 and second magnet 112 do not align when mechanism 100 is in the closed position (e.g., first magnet 108 is disposed between different curved openings than second magnet 112).

Although illustrated as a single magnet disposed in each piece in FIG. 1, in other implementations, multiple magnets may be disposed in each piece. For example, one or more additional magnets may be recessed in the inner surface of first piece 102, one or more additional magnets may be recessed in the inner surface of second piece 104, or both, as further described with reference to FIG. 5. Alternatively, only one of first piece 102 or second piece 104 may include a magnet.

In some implementations, first piece 102 includes a first tab 122. First tab 122 may be configured to make it easier for a user to transition first piece 102 and second piece 104 (e.g., mechanism 100) from the closed position to the open position. For example, first tab may extend beyond the circumference of mechanism 100 when in the closed position (as illustrated in FIG. 3) and may provide a target for the application of force by a user to transition mechanism 100 from the closed position to the open position. In some implementations, second piece 104 includes second tab 124, similar to first tab 122.

The tabs 122-124 may be disposed on opposite edges of the respective pieces than hinge 121. For example, first tab 122 may be positioned on an opposite edge (e.g., a left edge, in the orientation illustrated in FIG. 1) of first piece 102 as hinge 121. As another example, second tab 124 may be positioned on an opposite edge (e.g., a right edge, in the orientation illustrated in FIG. 1) of second piece 104 as hinge 121.

Tabs 122-124 may be aligned with opposite ends of the respective pieces. To illustrate, first piece 102 may have a first end 126 (e.g., a "top" end in the orientation illustrated in FIG. 1) and a second end 128 (e.g., a "bottom" end in the orientation illustrated in FIG. 1). Similarly, second piece 104 may have a first end 130 (e.g., a "top" end in the orientation illustrated in FIG. 1) and a second end 132 (e.g., a "bottom" end in the orientation illustrated in FIG. 1). First tab 122 may be aligned with second end 128 of first piece 102, and second tab 124 may be aligned with first end 130 of second piece 104. Thus, tabs 122-124 may be aligned with opposite ends of the respective pieces.

In addition to having a plurality of curved openings for use in marking a conduit, one or more of the ends of first piece 102 and second piece 104 may be used to mark the conduit. For example, first end 126 of first piece 102 and first end 130 of second piece 104 may be curved similar (but not exactly the same) as first plurality of curved openings 106 and second plurality of curved openings 110 such that a user may mark along the first ends 126 and 130 to mark the curved shape for cutting on a conduit. In some implementations, first end 126 and second end 128 may be sized and shaped such that the marked conduit forms an orthogonal joint with another conduit having the same diameter as the marked conduit. Second end 128 of first piece 102 and second end 132 of second piece 104 may be substantially perpendicular to the conduit (when the conduit is received in channel 302), and thus, marking along second ends 128 and 132 may enable marking a perpendicular cut on the conduit. Additionally, first ends 126 and 130 may curve downward (in the orientation illustrated in FIG. 1) from the edges of the respective piece to be the same as first plurality of curved openings 106 and second plurality of curved openings 110. Stated another way, a distance d4 from first end 126 to second end 128 along an edge of first piece 102 is greater than or equal to a distance d5 from first end 126 to second end 128 at a position between a first edge (e.g., a left edge) and a second edge (e.g., a right edge) of first piece 102. Because first ends 126 and 130 have such shapes, a saddle shape may be marked on a conduit by tracing first ends 126 and 130, which enables the conduit to be cut into a shape used to form an orthogonal joint with another conduit. Forming first ends 126 and 130 to have the downward curve may result in mechanism 100 using less material than if first ends 126 and 130 have an upward curve.

In some implementations, pieces 102-104 include one or more stencil features (e.g., notches) along the end of the respective piece. For example, first piece 102 may include a first notch 134 disposed along second end 128. Second piece 104 may similarly include second notch 136 disposed along second end 132. As illustrated in FIG. 1, notches 134-136 may be disposed along the same end (e.g., second ends 128 and 132) of the respective piece. When first piece 102 and second piece 104 (e.g., mechanism 100) is in the closed position, first notch 134 is aligned with second notch 136 such that first notch 134 is positioned approximately 180 degrees from second notch 136. Notches 134-136 may be used to mark the position of mechanism 100 on a conduit when mechanism 100 is in the closed position to center mechanism 100 on the conduit. Thus, if mechanism 100 is opened before marking is completed, mechanism 100 can be re-aligned in the same position and the marking can be completed.

In a particular implementation, an apparatus (e.g., 100) for forming orthogonal joints in conduits is disclosed. The apparatus includes a first piece (e.g., 102) including a first plurality of curved openings (e.g., 106). The apparatus includes a second piece (e.g., 104) including a second plurality of curved openings (e.g., 110). The apparatus includes a hinge (e.g., 121) configured to couple the first piece to the second piece and to enable the first piece and the second piece to be configurable in each of a closed position and an open position, where, when in the open position, the first piece is positioned adjacent to the second piece and, when in the closed position, the first piece and the second piece are configured to define a channel (e.g., 302) for receiving a conduit and each of the first plurality of curved openings is aligned with a corresponding one of the second plurality of curved openings. The apparatus further includes one or more magnets (e.g., 108, 112) coupled to the first piece or to the second piece.

In a particular implementation, an apparatus (e.g., 100) for forming orthogonal joints in conduits is disclosed. The apparatus includes a first piece (e.g., 102) including a first plurality of openings (e.g., 106). The apparatus includes a second piece (e.g., 104) including a second plurality of openings (e.g., 110). The first piece or the second piece includes at least one tab (e.g., 122, 124). The apparatus further includes a hinge (e.g., 121) configured to couple the first piece to the second piece and to enable the first piece and the second piece to be configurable in each of a closed position and an open position, where, when in the open position, the first piece is positioned adjacent to the second piece and, when in the closed configuration, the first piece and the second piece are configured to define a channel (e.g., 302) for receiving a conduit.

In a particular implementation, an apparatus (e.g., 100) for forming orthogonal joints in conduits is disclosed. The apparatus includes a first piece (e.g., 102) including a first plurality of openings (e.g., 106). The apparatus includes a first magnet (e.g., 108) recessed within an inner surface of the first piece. The apparatus further includes a hinge (e.g., 121) configured to couple the first piece to a second piece (e.g., 104) and to enable the first piece and the second piece to be configurable in each of a closed position and an open position.

Thus, FIGS. 1-3, 4A, and 4B describe mechanism 100 that may be used to mark a conduit (e.g., a pipe). For example, after closing mechanism 100 about the conduit, a user may mark (e.g., using a pen or marker) on the conduit according to the pluralities of curved openings 106 and 110. Marking the conduit in such a manner creates a pattern that can be cut into the conduit to form a shape (e.g., a saddle shape) that is used to make an orthogonal joint with another conduit. Because mechanism 100 includes curved openings with different shapes and/or sizes, mechanism 100 can be used to mark a conduit for forming an orthogonal joint with conduits of differing diameters. Additionally, in some implementations, first piece 102, second piece 104, or both include tabs 122-124 that make it easier for a user to transition mechanism 100 from the open position to the closed position or from the closed position to the open position.

Figure 5:
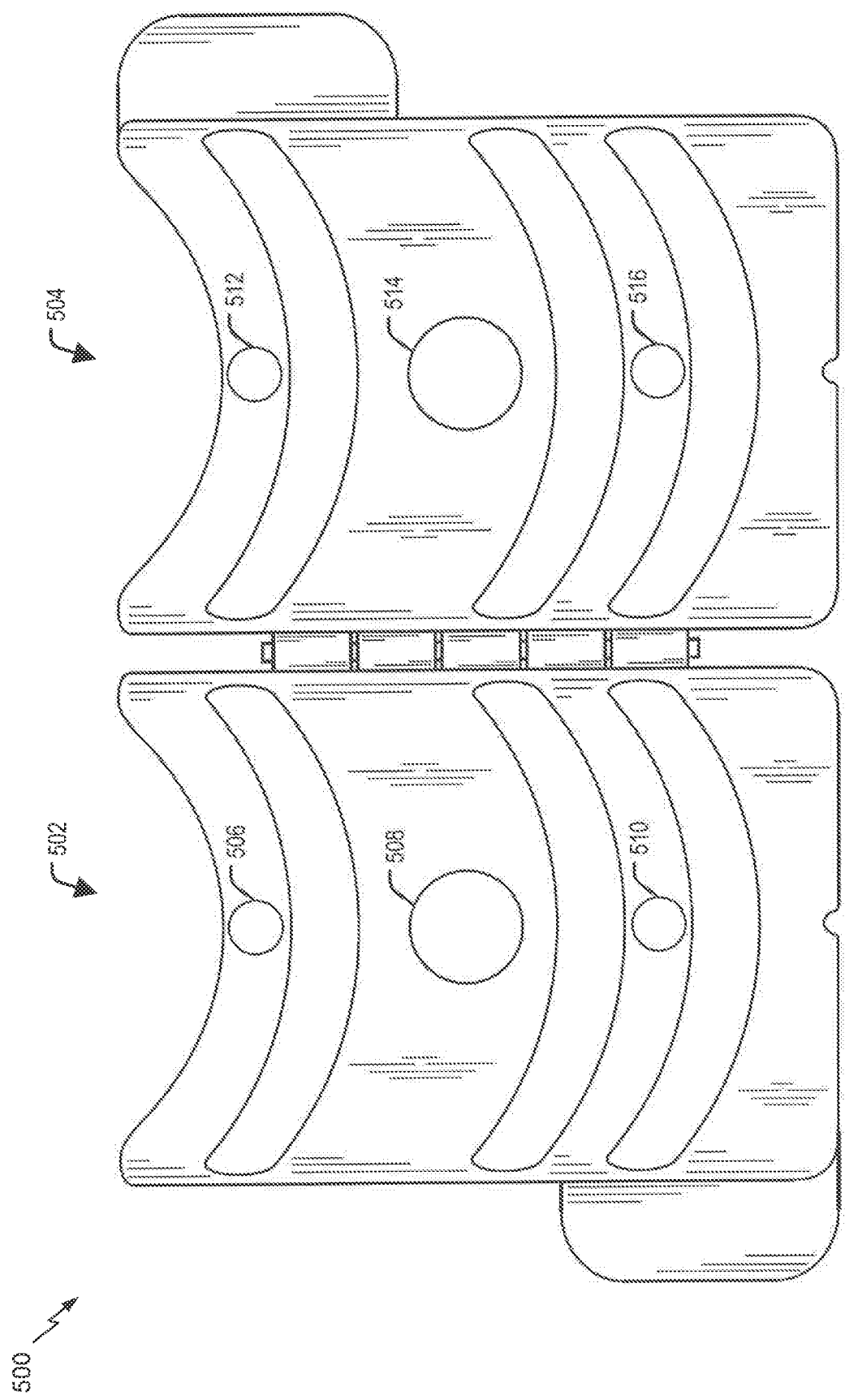
FIG. 5 is a diagram of a front view of a second implementation of a mechanism for forming orthogonal joints in conduits that may have differing diameters, the mechanism in an open position.

Referring to FIG. 5, a second implementation of a mechanism for forming orthogonal joints in conduits that may have differing diameters is depicted and designated 500. FIG. 5 illustrates a front view of mechanism 500 in the open position. Mechanism 500 is similar to mechanism 100 of FIG. 1, except that mechanism 500 includes multiple magnets in each piece.

To illustrate, mechanism 500 includes a first piece 502 and a second piece 504. First piece 502 may include a first plurality of magnets, and second piece 504 may include a second plurality of magnets. For example, first piece 502 may include a first magnet 506, a second magnet 508, and a third magnet 510, and second piece 504 may include a fourth magnet 512, a fifth magnet 514, and a sixth magnet 516. Although three magnets per piece are illustrated, in other implementations, each piece may include fewer than three or more than three magnets.

Each magnet may be recessed into an inner surface of a respective piece. For example, magnets 506-510 may be recessed into the inner surface of first piece 502, and magnets 512-516 may be recessed into the inner surface of second piece 504. In some implementations, magnets 506-510 may be coplanar with portions of the inner surface of first piece 502, and magnets 512-516 may be coplanar with portions of the inner surface of second piece 504.

In a particular implementation, magnets on each piece may be different sizes. For example, magnets 506-510 may be different sizes, and magnets 512-516 may be different sizes. Alternatively, magnets 506-510 may be the same size, and magnets 512-516 may be the same size. In some implementations, magnets 506-510 are the same size as corresponding magnets of magnets 512-516. In other implementations, magnets 506-510 are different sizes than corresponding magnets of magnets 512-516.

Magnets 506-516 may be disposed in various positions of the respective piece. For example, magnets 506-516 may be disposed between curved openings, or between curved openings and ends of the respective piece. Additionally, magnets 506-516 may be centered with respect to the curved openings. In other implementations, magnets 506-516 may be disposed in other positions.

Thus, FIG. 5 illustrates mechanism 500 including pieces with multiple magnets recessed in each piece. Including multiple magnets in each piece may improve the magnetic coupling of mechanism 500 to a conduit when mechanism 500 is in the closed position, and may further prevent mechanism 500 from sliding about the conduit when a user is marking the conduit according to one or more of the curved openings (or ends of mechanism 500).

Figure 6:
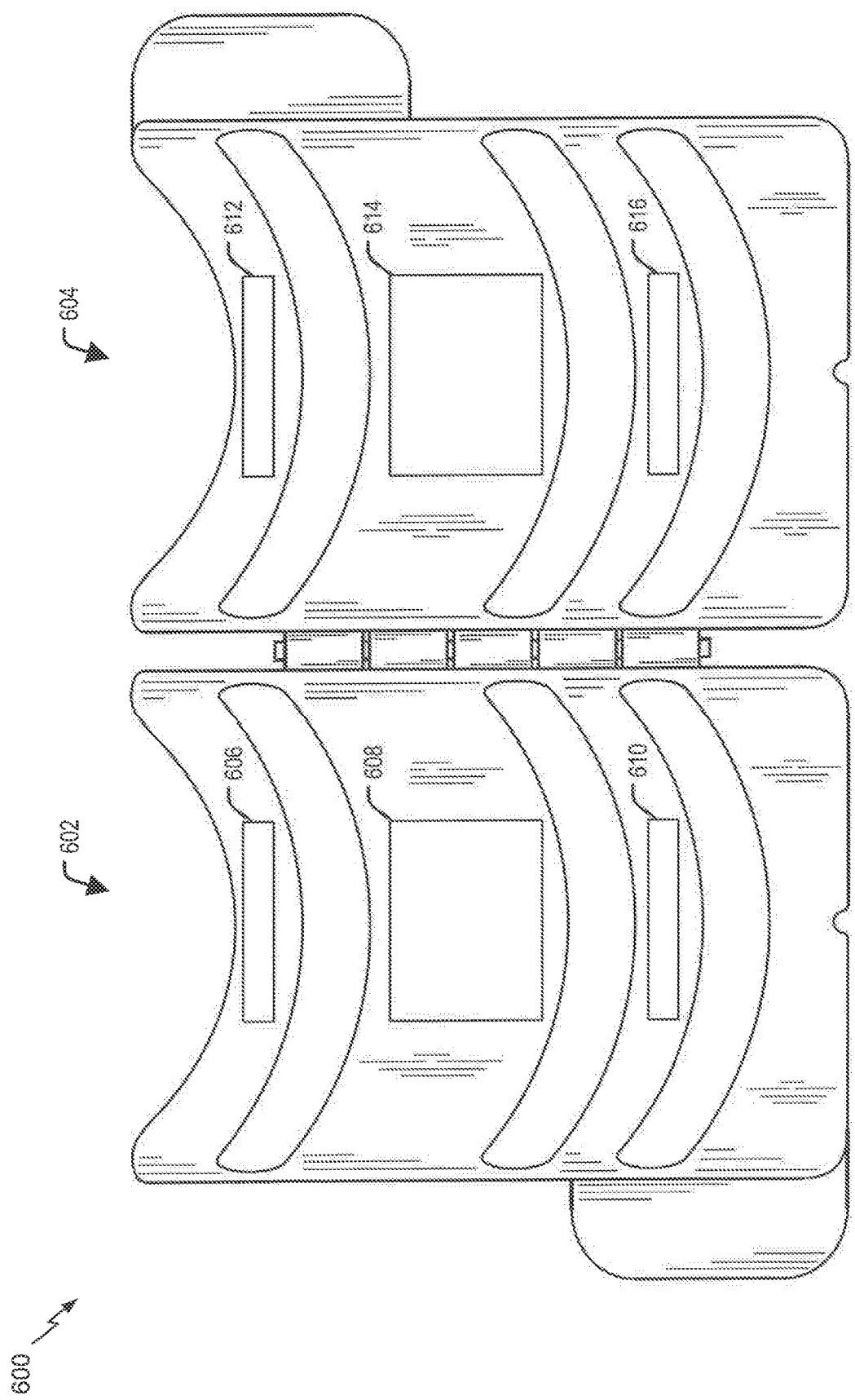
FIG. 6 is a diagram of a front view of a third implementation of a mechanism for forming orthogonal joints in conduits that may have differing diameters, the mechanism in an open position.

Referring to FIG. 6, a third implementation of a mechanism for forming orthogonal joints in conduits that may have differing diameters is depicted and designated 600. FIG. 6 illustrates a front view of mechanism 600 in the open position. Mechanism 600 is similar to mechanism 500 of FIG. 5, except that mechanism 600 includes multiple strips of magnetic material instead of multiple magnets.

To illustrate, mechanism 600 includes a first piece 602 and a second piece 604. First piece 602 may include a first plurality of strips of magnetic material, and second piece 604 may include a second plurality of strips of magnetic material. For example, first piece 602 may include a first strip of magnetic material 606, a second strip of magnetic material 608, and a third strip of magnetic material 610, and second piece 604 may include a fourth strip of magnetic material 612, a fifth strip of magnetic material 614, and a sixth strip of magnetic material 616. Although three strips of magnetic material per piece are illustrated, in other implementations, each piece may include fewer than three or more than three strips of magnetic material. Although illustrated as rectangular shapes, in other implementations, strips of magnetic material 606-616 may be other shapes, such as curved shapes, circular shapes, etc. Strips of magnetic material 606-616 may be coupled to the respective piece using adhesive or another coupling technique.

Thus, FIG. 6 illustrates mechanism 600 including pieces with multiple strips of magnetic material coupled in each piece. Including multiple strips of magnetic material coupled to each piece may improve the magnetic coupling of mechanism 600 to a conduit when mechanism 600 is in the closed position, and may further prevent mechanism 600 from sliding about the conduit when a user is marking the conduit according to one or more of the curved openings (or ends of mechanism 600). Additionally, using strips of magnetic material instead of magnets (as in FIG. 5) may simplify the fabrication process because recesses in the inner surfaces of the pieces are not required.

Figure 7:
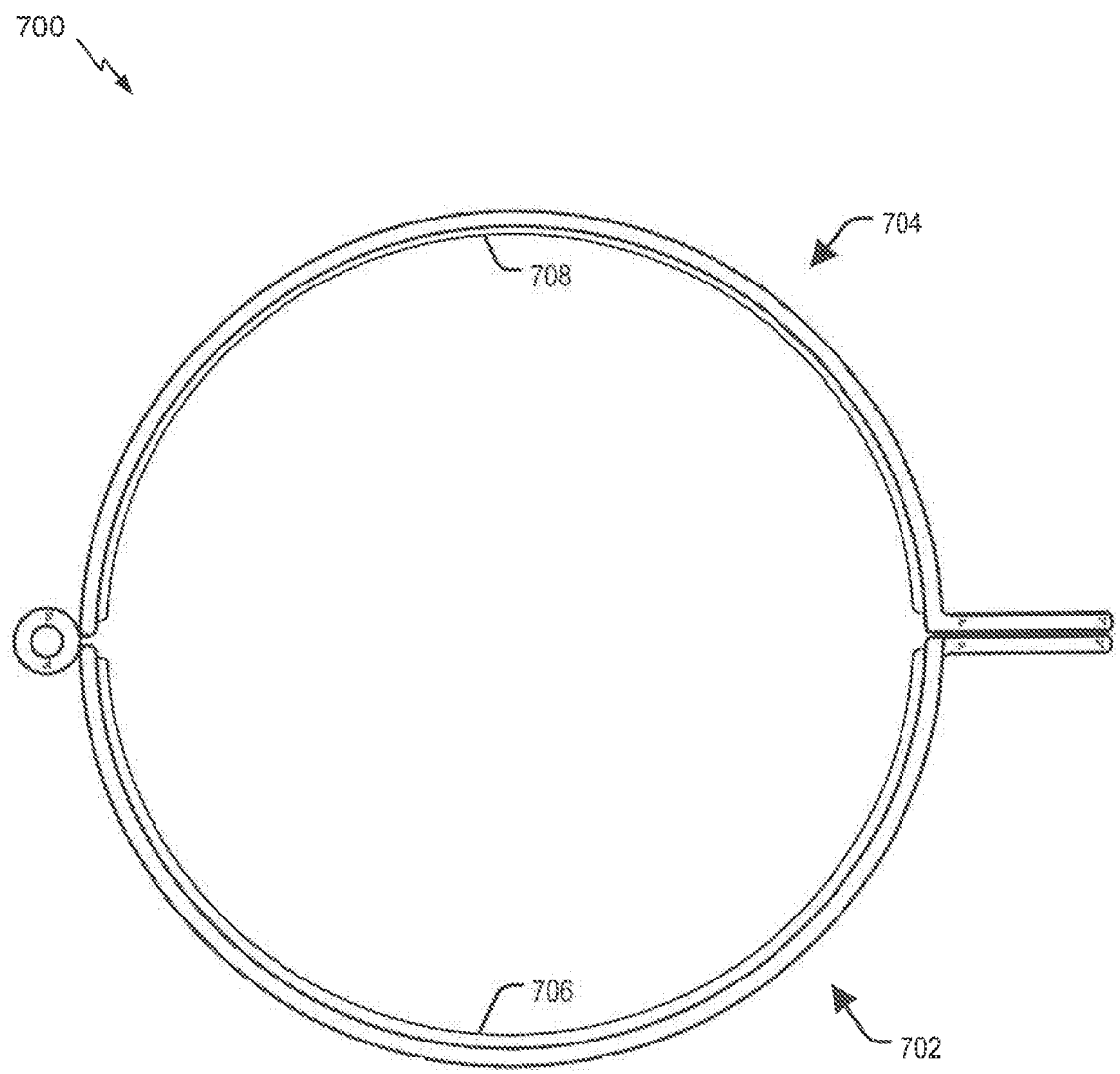
FIG. 7 is a diagram of a top view of a fourth implementation of a mechanism for forming orthogonal joints in conduits that may have differing diameters, the mechanism in a closed position.

Referring to FIG. 7, a fourth implementation of a mechanism for forming orthogonal joints in conduits that may have differing diameters is depicted and designated 700. FIG. 7 illustrates a top view of mechanism 700 in the closed position. Mechanism 700 is similar to mechanism 600 of FIG. 6, except that mechanism 700 includes layers of magnetic material instead of multiple strips of magnetic material.

To illustrate, mechanism 700 includes a first piece 702 and a second piece 704. First piece 702 may include a first layer of magnetic material 706 coupled thereto, and second piece 704 may include a second layer of magnetic material 708 coupled thereto. Each of the layers of magnetic material may have a shape similar to the respective piece, including a respective plurality of openings. Layers of magnetic material 706-708 may be coupled to the respective piece using adhesive or another coupling technique.

Thus, FIG. 7 illustrates mechanism 700 including pieces each with a layer of magnetic material coupled to the respective piece. Including layers of magnetic material coupled to each piece may improve the magnetic coupling of mechanism 700 to a conduit when mechanism 700 is in the closed position, and may further prevent mechanism 700 from sliding about the conduit when a user is marking the conduit according to one or more of the curved openings (or ends of mechanism 700). Additionally, using layers of magnetic material instead of magnets (as in FIG. 5) may simplify the fabrication process because recesses in the inner surfaces of the pieces are not required.

Figure 8:
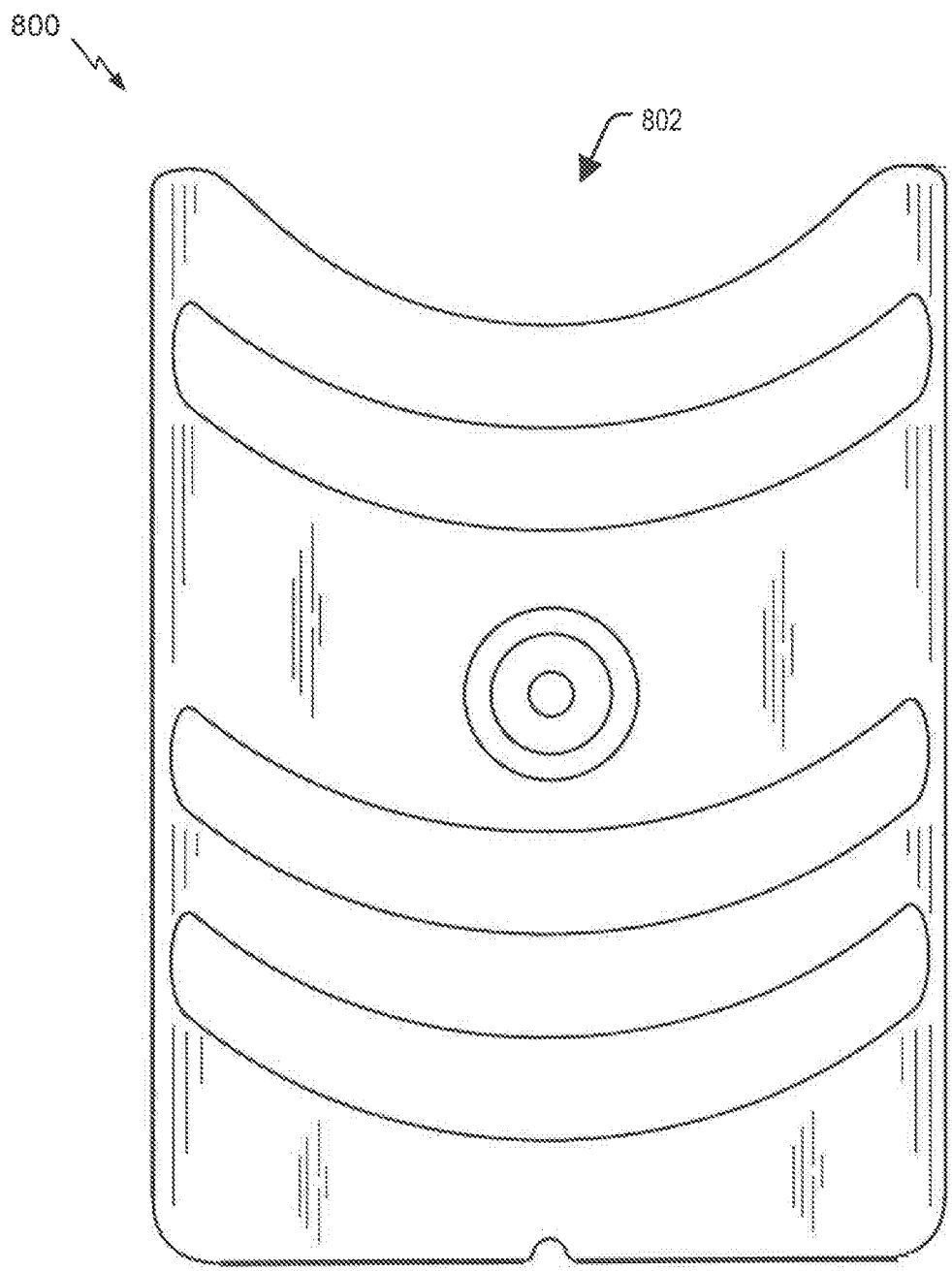
FIG. 8 is a diagram of a front view of a fifth implementation of a mechanism for forming orthogonal joints in conduits that may have differing diameters.

Referring to FIG. 8, a fifth implementation of a mechanism for forming orthogonal joints in conduits that may have differing diameters is depicted and designated 800. FIG. 8 illustrates a top view of mechanism 800 in the closed position.

Mechanism 800 differs from the mechanisms of FIGS. 1-7 in that mechanism 800 includes a single piece 802. The single piece 802 is cylindrical in shape, similar to when the two pieces of the other mechanisms are in the closed position. However, mechanism 800 does not have an open position. For example, no hinge is included in mechanism 800. Additionally, mechanism 800 does not include tabs (since there is not transitioning to an open position). Instead, mechanism 800 may be slid onto a conduit and held in place using one or more magnets that are recessed into an inner surface of single piece 802. In other implementations, strips of magnetic material or a layer of magnetic material may be used, as described with reference to FIGS. 6-7.

Figure 9:
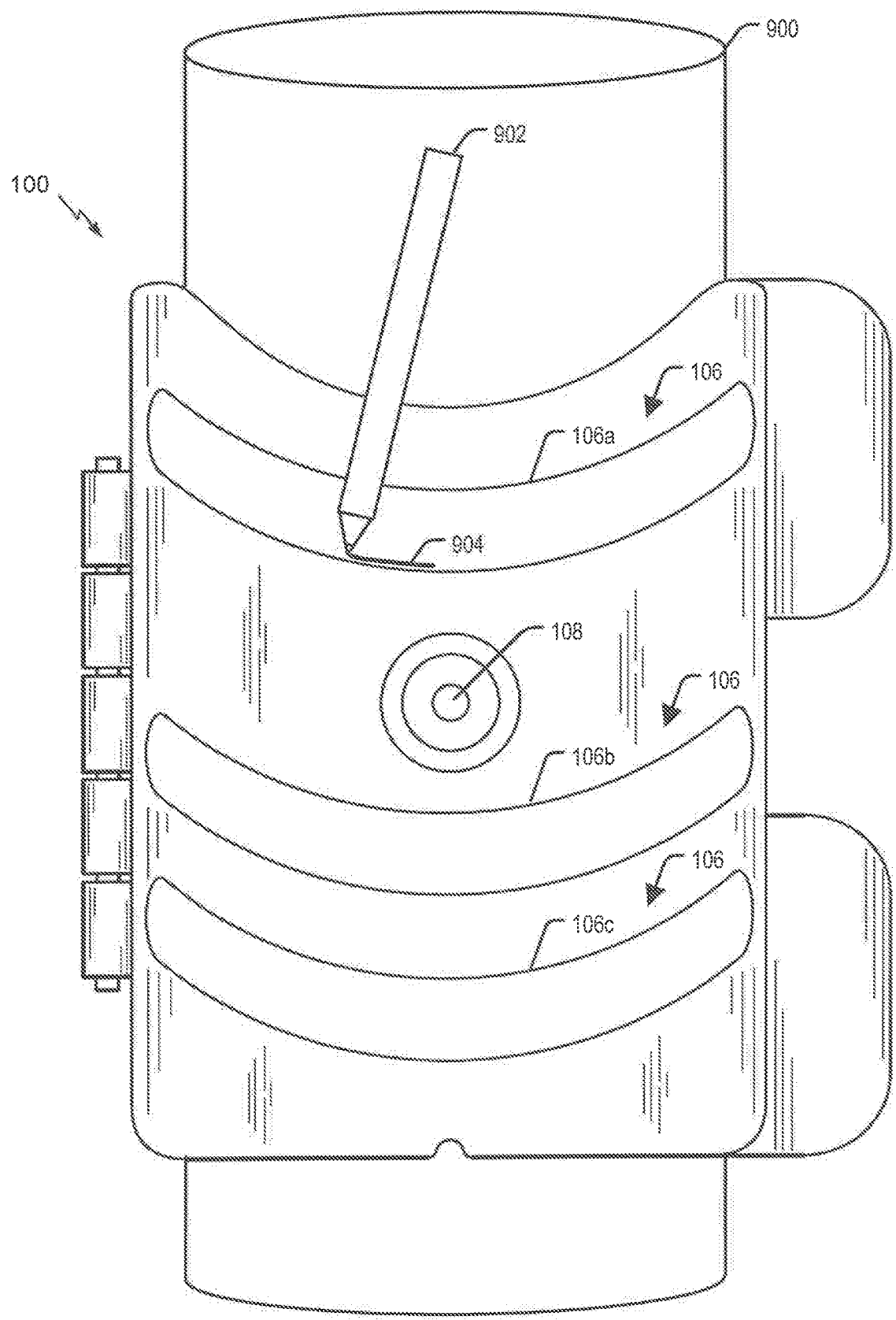
FIG. 9 is a diagram of a front view of the example mechanism of FIG. 1, the example mechanism in a closed position, surrounding a conduit.

Referring to FIG. 9, mechanism 100 of FIG. 1 is shown in a closed configuration. In FIG. 9, mechanism 100 surrounds a conduit 900 (e.g., a pipe). Conduit 900 is held in place such that mechanism 100 does not move with respect to conduit 900 by first magnet 108 and second magnet 112 (not shown). For example, first magnet 108 and second magnet 112 may be magnetically coupled to conduit 900.

Because mechanism 100 surrounds conduit 900, a user is able to mark conduit 900 in accordance with one of the first plurality of curved openings 106. For example, a user may user a marking instrument 902 (e.g., a pencil, a pen, a marker, etc.) in accordance with one of the curved openings. In the example illustrated in FIG. 9, marking instrument 902 creates a marking 904 on conduit 900 in accordance with (e.g., around the shape defined by) first curved opening 106a. By marking conduit 900 in such a manner, a user may know where to cut conduit 900 to form an orthogonal connection with another conduit. Although marking in accordance with first curved opening 106a is illustrated, any of first plurality of curved openings 106 (or second plurality of curved openings 110) may be used to mark conduit 900.

Figure 10:
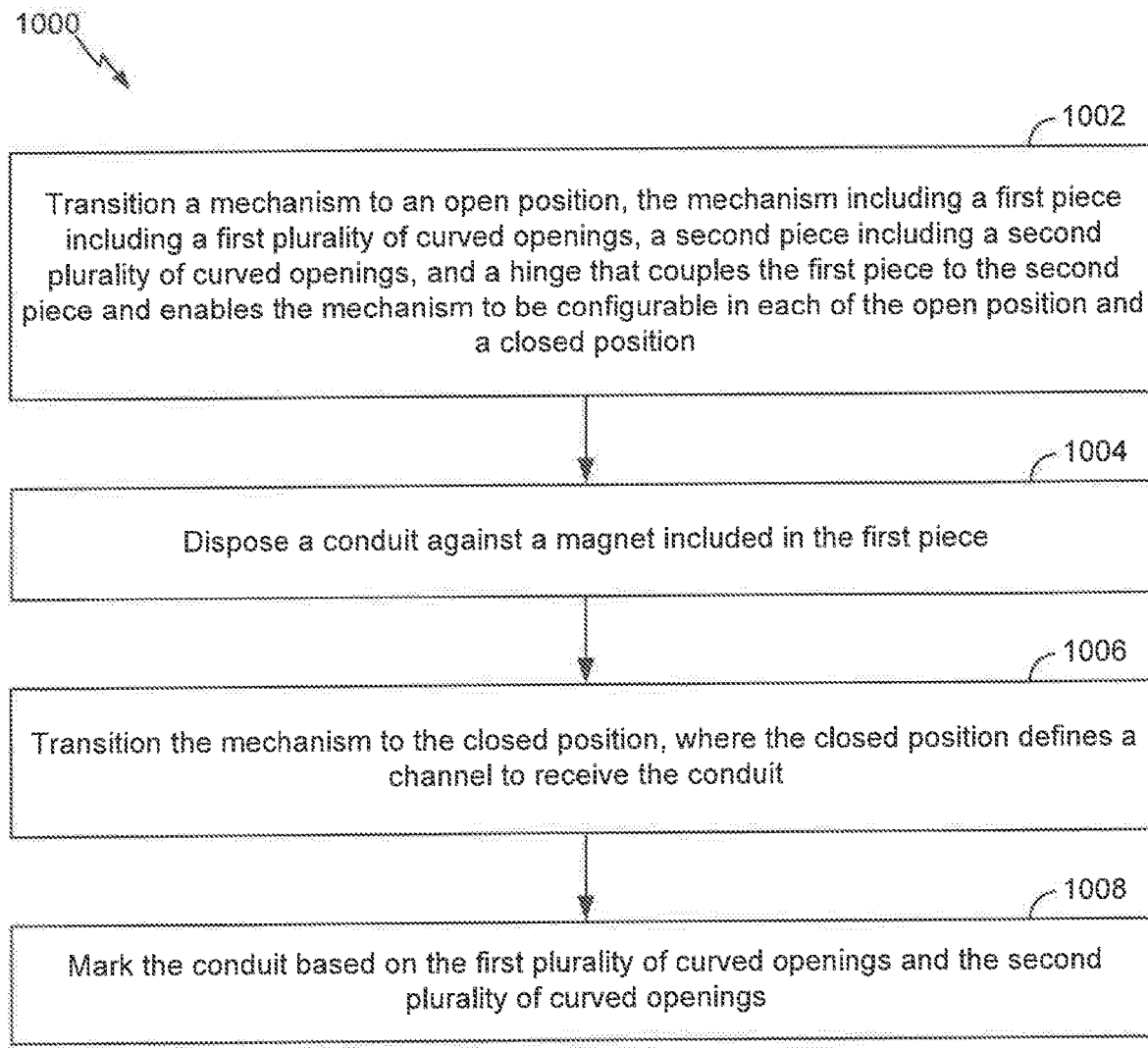
FIG. 10 is a flow diagram of an example of a method of operating a mechanism for forming orthogonal joints in conduits that may have differing diameters.

Referring to FIG. 10, a flow diagram of a method of operating a mechanism for forming orthogonal joints in conduits that may have differing diameters is shown as a method 1000. At 1002, method 1000 includes transitioning a mechanism to an open position. The mechanism includes a first piece including a first plurality of curved openings, a second piece including a second plurality of curved openings, and a hinge that couples the first piece to the second piece and enables the mechanism to be configurable in each of the open position and a closed position. For example, mechanism 100 (e.g., first piece 102 and second piece 104) may be transitioned to the open position illustrated in FIG. 1.

At 1004, the method 1000 includes disposing a conduit against a magnet included in the first piece. For example, a conduit (e.g., a pipe) may be disposed against first magnet 108 (and first piece 102) or against second magnet 112 (and second piece 104).

At 1006, the method 1000 includes transitioning the mechanism to the closed position. The closed position defines a channel to receive the conduit. For example, mechanism 100 may be transitioned to the closed position illustrated in FIGS. 2 and 3. When in the closed position, mechanism 100 includes channel 302 configured to receive the conduit.

At 1008, the method 1000 includes marking the conduit based on the first plurality of curved openings and the second plurality of curved openings. For example, a user, using a pen or marker, may mark on the conduit according to first plurality of curved openings 106 and second plurality of curved openings 110 (or ends of mechanism 100). The shape marked using first plurality of curved openings 106 and second plurality of curved openings 110 is the shape used to form an orthogonal joint with another conduit.

In a particular implementation, the mechanism includes a first magnet recessed into an inner surface of the first piece or the second piece. For example, mechanism 100 includes first magnet 108, second magnet 112, or both, recessed into the inner surfaces of the respective pieces.

In a particular implementation, the first piece includes a first tab, the second piece includes a second tab, or both. For example, first piece 102 may include first tab 122 and second piece 104 may include second tab 124. Tabs 122-124 may make it easier for a user to transition mechanism 100 from the open position to the closed position or from the closed position to the open position.

Thus, method 1000 describes operation of a mechanism that enables a user to mark a conduit with shapes that can be used to cut the conduit into a shape to be used as an orthogonal joint with another conduit. For example, after closing the mechanism about the conduit, the mechanism is held in place by a magnet (or multiple magnets) such that the user may mark the conduit (e.g., using a pen or marker) without the mechanism sliding or moving about the conduit.

Figure 11:
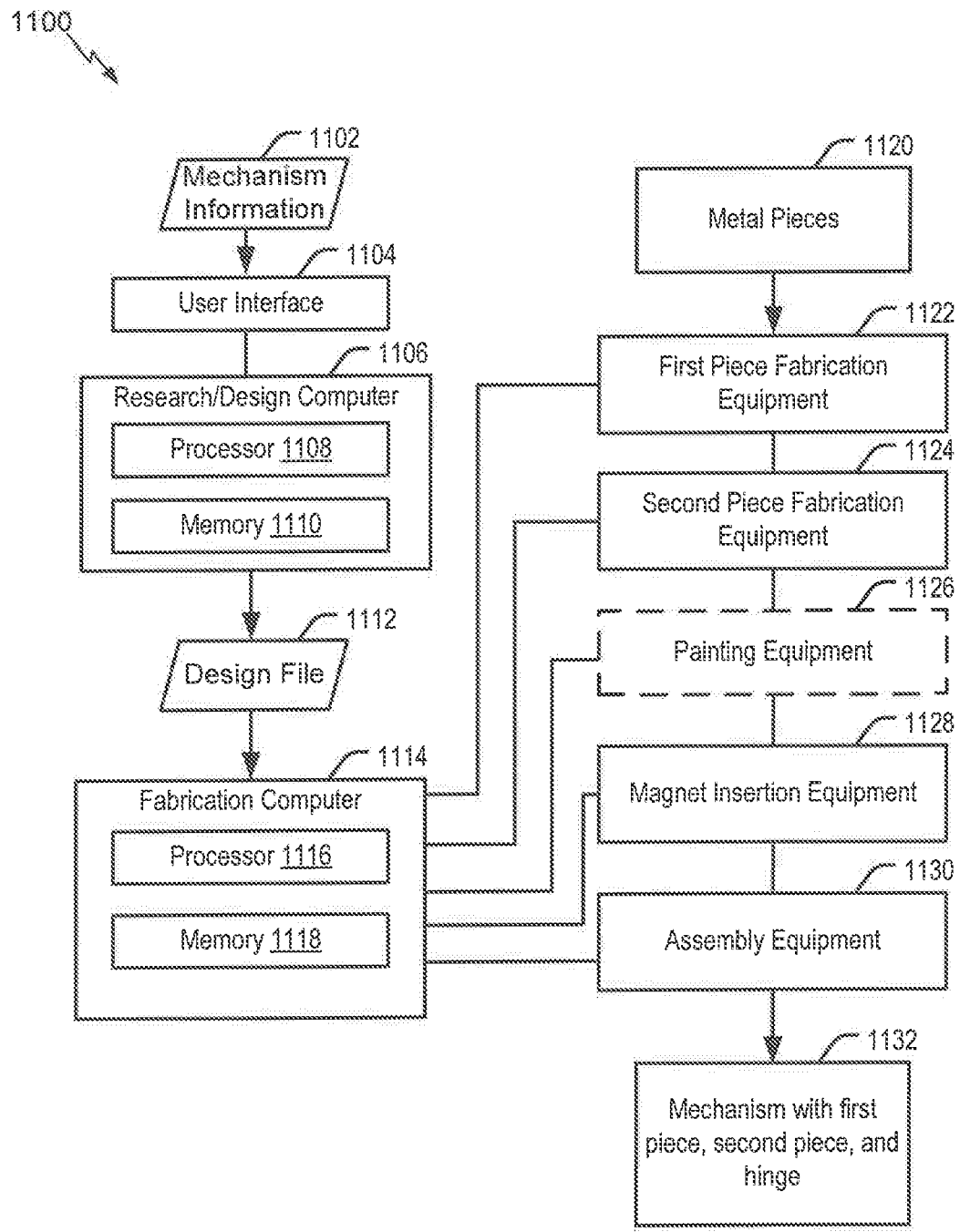
FIG. 11 is a block diagram of an example of a fabrication system for fabricating a mechanism for forming orthogonal joints in conduits that may have differing diameters.

The foregoing disclosed pieces (and mechanisms) may be designed and configured into computer files stored on a computer readable media. Some or all of such files may be provided to fabrication handlers who fabricate the pieces (and/or mechanisms) based on such files. The mechanisms may then be used to mark conduits for forming orthogonal joints, as described above. FIG. 11 depicts an example of a system 1100 for fabricating mechanisms for forming orthogonal joints in conduits having differing diameters.

Mechanism information 1102 is received at a research/design computer 1106. Mechanism information 1102 may include design information representing at least one physical property of a mechanism, such as mechanisms 100, 500, 600, 700, or 800. For example, mechanism information 1102 may include shapes of pieces, locations of curved openings, locations of hinges, locations of recesses and magnets or magnetic material, locations of tabs, locations of notches, etc. that are entered via a user interface 1104 coupled to research/design computer 1106. Research/design computer 1106 includes a processor 1108, such as one or more processing cores, coupled to a computer readable medium such as a memory 1110. Memory 1110 may store computer readable instructions that are executable to cause processor 1108 to transform mechanism information 1102 into a design file 1112. Design file 1112 may include information indicating a design for a mechanism, such as shapes of pieces, locations of curved openings, locations of hinges, locations of recesses and magnets or magnetic material, locations of tabs, locations of notches, etc. Design file 1112 may be in a format that is usable by other systems to perform fabrication, as further described herein.

Design file 1112 is provided to a fabrication computer 1114 to control fabrication equipment during a fabrication process for a metal pieces 1120 (e.g., pieces that have not been shaped, had curved holes formed, etc.). Although described as metal pieces, in other implementations, the pieces may be plastic or other materials. Fabrication computer 1114 includes a processor 1116 (e.g., one or more processors), such as one or more processing cores, and a memory 1118. Memory 1118 may include executable instructions such as computer-readable instructions or processor-readable instructions that are executable by a computer, such as processor 1116. The executable instructions may enable processor 1116 to control fabrication equipment, such as by sending one or more control signals or data, during a fabrication process for metal pieces 1120 (e.g., pieces that have not been shaped, had curved holes formed, etc.). In some implementations, the fabrication system (e.g., an automated system that performs the fabrication process) may have a distributed architecture. For example, a high-level system (e.g., processor 1116) may issue instructions to be executed by controllers of one or more lower-level systems (e.g., individual pieces of fabrication equipment). The lower-level systems may receive the instructions, may issue sub-commands to subordinate modules or process tools, and may communicate status back to the high-level system. Thus, multiple processors (e.g., processor 1116 and one or more controllers) may be distributed in the fabrication system.

The fabrication equipment includes first piece fabrication equipment 1122, second piece fabrication equipment 1124, optional painting equipment 1126, magnet insertion equipment 1128, and assembly equipment 1130. First piece fabrication equipment 1122 is configured to form a first piece of the mechanism, such as first piece 102 of mechanism 100. For example, first piece fabrication equipment 1122 may include cutting equipment, an etcher, or other equipment configured to form the shape of the first piece, including the respective tab and notch. Additionally, first piece fabrication equipment 1122 may include an etching device, a punching device, a drill, or other equipment configured to form a first plurality of curved openings, such as first plurality of curved openings 106. Second piece fabrication equipment 1124 is configured to form a second piece of the mechanism, such as second piece 104 of mechanism 100. For example, second piece fabrication equipment 1124 may include cutting equipment, an etcher, or other equipment configured to form the shape of the second piece, including the respective tab and notch. Additionally, second piece fabrication equipment 1124 may include an etching device, a punching device, a drill, or other equipment configured to form a second plurality of curved openings, such as second plurality of curved openings 110. Although described as two distinct pieces of fabrication equipment, in other implementations, first piece fabrication equipment 1122 (or second piece fabrication equipment 1124) may be used to form both the first piece and the second piece.

Painting equipment 1126 is configured to paint the first piece and the second piece. For example, painting equipment 1126 may paint the first piece and the second piece a selected color. In a particular implementation, the color corresponds to the diameter of the mechanism formed by the first piece and the second piece when the mechanism is in the closed position.

Magnet insertion equipment 1128 may be configured to insert a magnet into a recess of an inner surface of the first piece or the second piece (or both). For example, magnet insertion equipment 1128 may deposit an adhesive in the recess(es) prior to depositing the magnet(s). In other implementations, the magnets may be attached to the pieces in a different way.

Assembly equipment 1130 may be configured to assemble the mechanism from the various pieces. For example, assembly equipment 1130 may be configured to couple the first piece to the second piece (if each piece includes a respective portion of a hinge) and to insert a rod (or a pin) into the hinge to assemble the device. Alternatively, if the hinge is a separate component, assembly equipment 1130 may be configured to attach the hinge to the first piece and the second piece.

Fabrication computer 1114 may be configured to initiate one or more operations of first piece fabrication equipment 1122, second piece fabrication equipment 1124, painting equipment 1126, magnet insertion equipment 1128, and assembly equipment 1130. For example, processor 1116 may execute instructions stored at memory 1118 to perform operations including initiating formation of a first piece including a first plurality of curved openings, a first recess, and a first tab. The operations include initiating formation of a second piece including a second plurality of curved openings, a second recess, and a second tab. In a particular implementation, formation of the first piece and the second piece is initiated at least partially concurrently. In an alternate implementation, formation of the second piece is initiated after formation of the first piece. In some implementations, the operations include initiating painting of the first piece and the second piece. The operations also include initiating attachment of the one or more magnets to the first piece and/or the second piece. The operations further include initiating assembly of the mechanism.

Performing the fabrication operations on metal pieces 1120 operates to form mechanism 1132. Mechanism 1132 includes a first piece, a second piece, and in some implementations, a hinge coupling the first piece to the second piece. For example, mechanism 1132 may include or correspond to mechanisms 100, 500, 600, 700, or 800.

System 1100 enables fabrication of mechanism 1132 for forming orthogonal joints in conduits that may have differing diameters. For example, after closing mechanism 1132 about the conduit, a user may mark (e.g., using a pen or marker) on the conduit according to the pluralities of curved openings in mechanism 1132. Marking the conduit in such a manner creates a pattern that can be cut into the conduit to form a shape (e.g., a saddle shape) that is used to make an orthogonal joint with another conduit. Because mechanism 1132 includes curved openings having different shapes and/or sizes, mechanism 1132 can be used to mark a conduit for use in forming an orthogonal joint with conduits of differing diameters. Additionally, in some implementations, the first piece, the second piece, or both include tabs that make it easier for a user to transition mechanism 1132 from the open position to the closed position or from the closed position to the open position.

Figure 12:
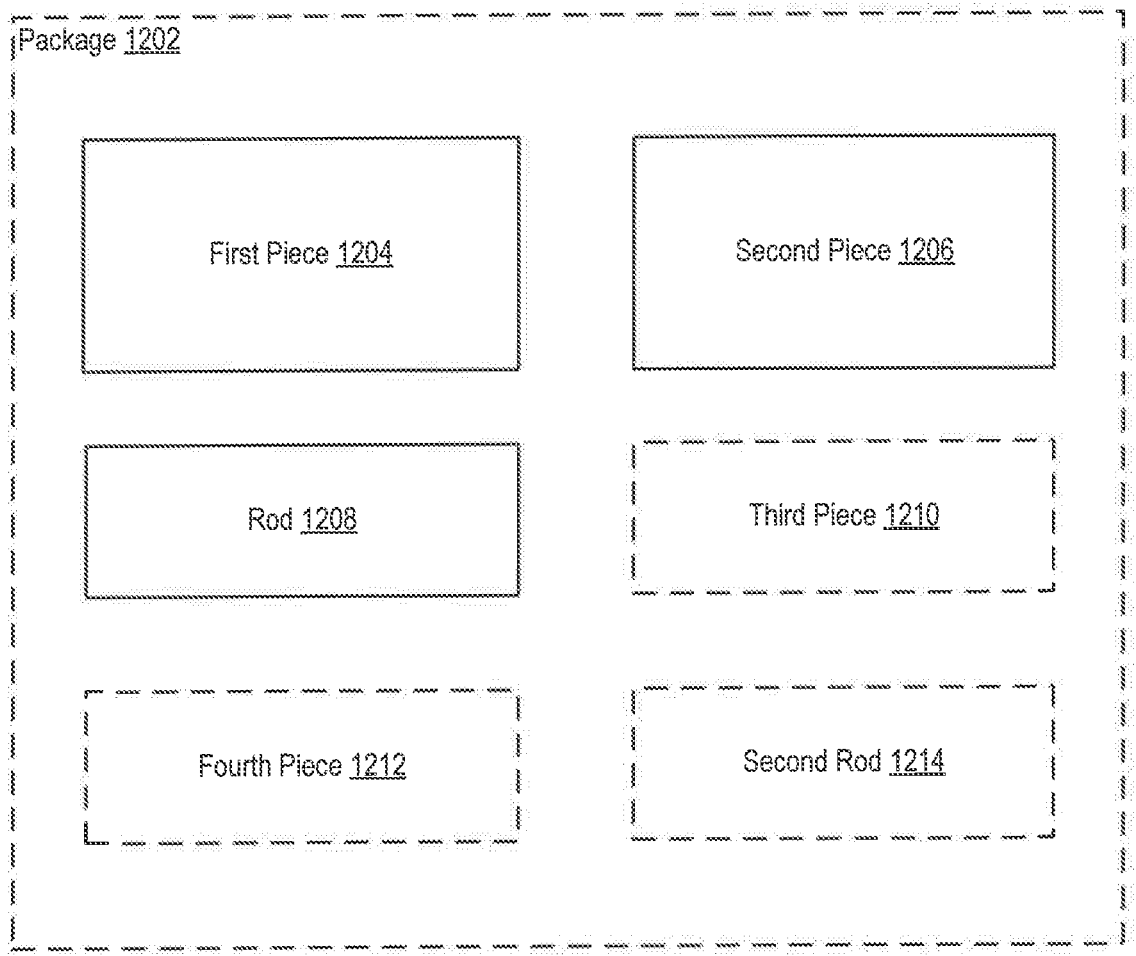
FIG. 12 is a block diagram of an example of a kit including components of a mechanism for forming orthogonal joints in conduits that may have differing diameters.

Referring to FIG. 12, a kit 1200 for a mechanism for forming orthogonal joints in conduits of that may have diameters, such as mechanism 100 of FIG. 1, is shown. Kit 1200 includes a first piece 1204, a second piece 1206, and a rod 1208 (or a pin). First piece 1204 includes a plurality of curved openings. For example, first piece 1204 may include or correspond to first piece 102 which includes first plurality of curved openings 106. Second piece 1206 includes a plurality of curved openings. For example, second piece 1206 may include or correspond to second piece 104 which includes second plurality of curved openings 110.

In a particular implementation, first piece 1204, second piece 1206, or both include a magnet recessed within an inner surface of the respective piece, as described with reference to FIG. 1. In other implementations, first piece 1204, second piece 1206, or both include multiple magnets recessed within the inner surface of the respective piece. In still other implementations, first piece 1204, second piece 1206, or both include strips of magnetic material or layers of magnetic material. Additionally, or alternatively, first piece 1204, second piece 1206, or both include a tab as part of the respective piece. For example, first piece 1204 may include first tab 122, second piece 1206 may include second tab 124, or both.

Rod 1208 may be included to be inserted into hinge portions to form a hinge that couples first piece 1204 to second piece 1206. For example, first piece 1204 may include a portion of a hinge, second piece 1206 may include a portion of a hinge, and rod 1208 may be inserted into the portions of the hinge to form the hinge that couples first piece 1204 to second piece 1206. Alternatively, the hinge may be a separate component that is included in kit 1200.

In some implementations, kit 1200 may include a package 1202. For example, package 1202 may include a box, a bag, a container, or the like. Additionally, or alternatively, package 1202 may include a packaging medium (e.g., packaging material), such as foam, paper, or the like. Package 1202 may also include first piece 1204, second piece 1206, and rod 1208. In some implementations, package 1202 may also include one or more additional elements, as further described herein.

In some implementations, kit 1200 may include a third piece 1210, a fourth piece 1212, and a second rod 1214. Although four pieces are shown as being included in kit 1200, in other implementations, more than four pieces may be included in kit 1200. Third piece 1210 and fourth piece 1212 may include pluralities of curved openings, magnets, and tabs, as described with reference to first piece 1204 and second piece 1206. Additionally, third piece 1210 may include a portion of a hinge, fourth piece 1212 may include a portion of a hinge, and second rod 1214 may be inserted in the portions of the hinge to form the hinge the couples third piece 1210 to fourth piece 1212. When in the closed position, the mechanism formed by third piece 1210 and fourth piece 1212 may have a different diameter than the mechanism formed by first piece 1204 and second piece 1206, when in the closed position.

Thus, FIG. 12 describes a kit for a mechanism for forming orthogonal joints in conduits that may have differing diameters. Kit 1200 may include the disassembled pieces of the mechanism, which may take up less volume and thus save money on shipping costs to the consumer. Additionally, kit 1200 may include pieces of multiple mechanisms having different diameters when in the closed position.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An apparatus for forming orthogonal joints in conduits, the apparatus comprising:
a first piece including a first plurality of curved openings and a first magnet positioned in a longitudinal direction between a first opening of the first plurality of curved openings and a second opening of the first plurality of curved openings;
a second piece including a second plurality of curved openings and a second magnet positioned in the longitudinal direction between a third opening of the second plurality of curved openings and a fourth opening of the second plurality of curved openings;
a hinge configured to couple the first piece to the second piece and to enable the first piece and the second piece to be configurable in each of a closed position and an open position, where:
when in the open position, the first piece is positioned adjacent to the second piece; and
when in the closed position, the first piece and the second piece are configured to define a channel for receiving a conduit and each of the first plurality of curved openings is aligned with a corresponding one of the second plurality of curved openings.

2. The apparatus of claim 1, where one or more characteristics of a first curved opening of the first plurality of curved openings corresponds to a measurement of a first receiving conduit, and where one or more characteristics of a second curved opening of the first plurality of curved openings corresponds to a measurement of a second receiving conduit.

3. The apparatus of claim 1, where a distance from a first end of the first piece to a second end of the first piece along an edge of the first piece is greater than or equal to a distance from the first end to the second end at a position between a first edge of the first piece and a second edge of the first piece.

4. The apparatus of claim 1, where the first piece includes a first notch disposed along a first end of the first piece, where the second piece includes a second notch disposed along a first end of the second piece, where the first end of the first piece and the first end of the second piece are at the same end, and where the first notch, the second notch, or both are configured to enable marking of an alignment position on the conduit.

5. The apparatus of claim 4, where, when the first piece and the second piece are in the closed position, the first notch is positioned approximately 180 degrees from the second notch.

6. The apparatus of claim 1, where the first magnet is recessed within an inner surface of the first piece and the second magnet is recessed within an inner surface of the second piece.

7. The apparatus of claim 1, where the first piece includes a first tab aligned with a first end of the first piece, and where the second piece includes a second tab aligned with a second end of the second piece that is opposite of the first end of the first piece in the longitudinal direction.

8. An apparatus for forming orthogonal joints in conduits, the apparatus comprising:
a first piece including a first plurality of openings and a first magnet positioned in a longitudinal direction between a first opening of the first plurality of openings and a second opening of the first plurality of openings;
a second piece including a second plurality of openings and a second magnet positioned in the longitudinal direction between a third opening of the second plurality of openings and a fourth opening of the second plurality of openings, where the first piece or the second piece include at least one tab; and
a hinge configured to couple the first piece to the second piece and to enable the first piece and the second piece to be configurable in each of a closed position and an open position, where:
when in the open position, the first piece is positioned adjacent to the second piece; and
when in the closed position, the first piece and the second piece are configured to define a channel for receiving a conduit.

9. The apparatus of claim 8, where the at least one tab is positioned on an opposite edge of the first piece or the second piece as the hinge.

10. The apparatus of claim 8, where the at least one tab includes a first tab included on the first piece and a second tab included on the second piece, where the first tab is aligned with a first end of the first piece and the second tab is aligned with a second end of the second piece, the first end opposite of the second end in the longitudinal direction.

11. The apparatus of claim 8, where the first magnet is recessed within an inner surface of the first piece, and where the second magnet is recessed within an inner surface of the second piece.

12. An apparatus for forming orthogonal joints in conduits, the apparatus comprising:
a first piece including a first plurality of openings;
a first magnet recessed within an inner surface of the first piece and positioned in a longitudinal direction between a first opening of the first plurality of openings and a second opening of the first plurality of openings; and
a hinge configured to couple the first piece to a second piece and to enable the first piece and the second piece to be configurable in each of a closed position and an open position.

13. The apparatus of claim 12, where the first magnet has a circular shape.

14. The apparatus of claim 12, where a surface of the first magnet is substantially coplanar with respect to at least a portion of the inner surface of the first piece.

15. The apparatus of claim 12, where a distance in the longitudinal direction between the first magnet and the first opening and a distance in the longitudinal direction between the first magnet and the second opening are less than a distance in the longitudinal direction between the first opening and the second opening.

16. The apparatus of claim 12, further comprising:
the second piece including a second plurality of openings, where:
when in the open position, the first piece is adjacent to the second piece; and
when in the closed position, the first piece and the second piece define a channel configured to receive a conduit; and
a second magnet recessed within an inner surface of the second piece and positioned in the longitudinal direction between a third opening of the second plurality of openings and a fourth opening of the second plurality of openings.

17. The apparatus of claim 16, where, when in the closed position, the first magnet is aligned with the second magnet.

18. The apparatus of claim 16, further comprising:
   one or more additional magnets recessed in the inner surface of the first piece; and
   one or more additional magnets recessed in the inner surface of the second piece.

19. The apparatus of claim 12, where the first piece includes a first tab, the second piece includes a second tab, or both.

20. The apparatus of claim 19, where the first tab is aligned with a first end of the first piece, and where the second tab is aligned with a second end of the second piece that is opposite of the first end of the first piece in the longitudinal direction.

* * * * *